Oct. 16, 1923.

A. E. JURY

TIRE AND FABRIC THEREFOR

Filed July 3, 1922

1,470,924

Inventor
Alfred E. Jury
By his Attorney
Ernest Hopkinson.

Patented Oct. 16, 1923.

1,470,924

UNITED STATES PATENT OFFICE.

ALFRED E. JURY, OF RUTHERFORD, NEW JERSEY, ASSIGNOR TO MORGAN & WRIGHT, A CORPORATION OF MICHIGAN.

TIRE AND FABRIC THEREFOR.

Application filed July 3, 1922. Serial No. 572,365.

*To all whom it may concern:*

Be it known that I, ALFRED E. JURY, a citizen of the United States, residing at Rutherford, county of Bergen, State of New Jersey, have invented certain new and useful Improvements in a Tire and Fabric Therefor, of which the following is a full, clear, and exact description.

This invention relates in general to reinforced rubber articles and in particular to a fabric for pneumatic tire casings.

The present day cord tire is reinforced with stress-resisting-elements built up in layers and imbedded in rubber. The cords or stress-resisting-elements are particularly liable to chafe or abrade one another in the same layer where they contact, or are liable to, because of their close parallel arrangement. Heretofore the cords or stress-resisting-elements have all been twisted in the same direction so that their yarns or strands crossed at a substantial angle the yarns or strands of contiguous elements at their lines of contact. In consequence of the inevitable flexing in service, the constituent yarns or strands rubbed or sawed each other most disadvantageously and not infrequently soon rendered a tire casing unfit for service.

The present invention aims to increase the life of rubber articles, such as tires, that are reinforced by making the fabric with stress-resisting-elements alternately formed of strands or yarns twisted together oppositely at least on the exterior of the elements. Thereby, the constituent strands or yarns of neighboring elements, which are normally either in contact or in such immediate contiguity as to be liable to abrade one another, are disposed so as to extend, where they come together, in the same general direction —that is, in lengthwise, in contra-distinction to crosswise, relation—thus minimizing, if not eliminating, the sawing action heretofore attending use of the article.

An embodiment of the invention is illustrated in the accompanying drawings in which:—

Figure 1:
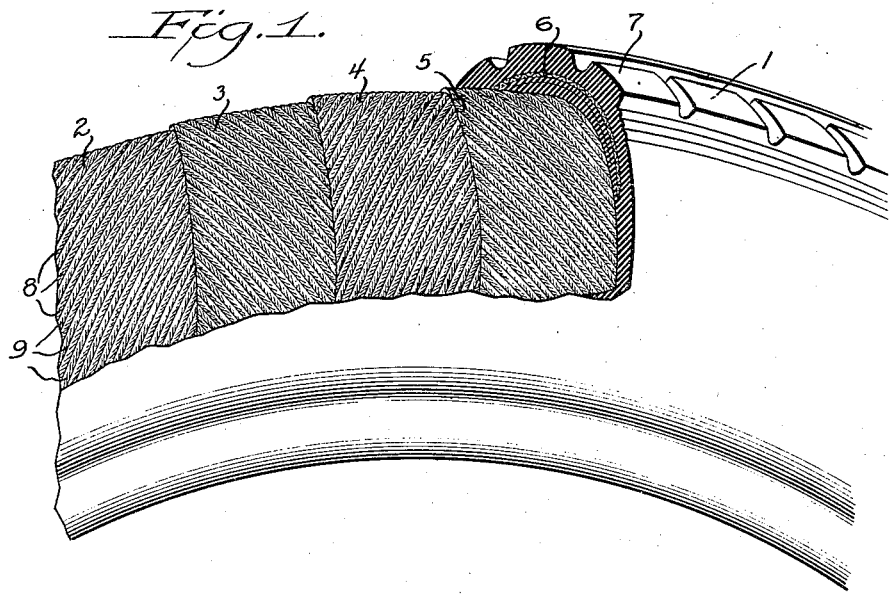
Fig. 1 is a perspective view of a tire with several of the plies stripped back to show the usual and general disposition of the stress-resisting-elements.

The stress-resisting-elements may be manufactured variously. I may take four strands of what is commercially known as 6-hank roving and twist these rovings together about six or eight times per inch. According to my invention, I twist the rovings together to the right for one set of elements, say the first, third, fifth, etc., and to the left for the other set of elements, say the second, fourth, sixth, etc.

Or, I may ply together coarse yarns taking, for instance, four strands of yarn that is commercially known as 6's. For one set of the stress-resisting-elements, I may employ coarse yarns, or 6's, which have been individually twisted to the right, and ply these together by twisting them to the left. For the other set of stress-resisting elements, coarse yarn, or 6's, which has been individually twisted to the left, are employed and plied by twisting them together to the right.

Or, for one set of the elements, I may employ five single yarns—26's—that have been individually twisted to the right and twist these together also to the right; then, take a suitable number, say three, of these plied yarns and twist them together to the left. For the stress-resisting-elements of the other set, I may employ a single yarn that had been twisted to the left and twist five of these single yarns together to the left; and then, a suitable number, such as three, of these plied yarns are twisted together to the right to form an element.

In the drawings, the invention is illustrated conventionally as applied to a pneumatic tire casing 1 having a plurality of plies 2, 3, 4 and 5, constituting the carcass, and a breaker strip 6, all these imbedded in vulcanized rubber and surrounded by a tread 7. As usual, the plies alternately have their stress-resisting-elements inclined oppositely so as to balance the plied up structure.

Figure 2:
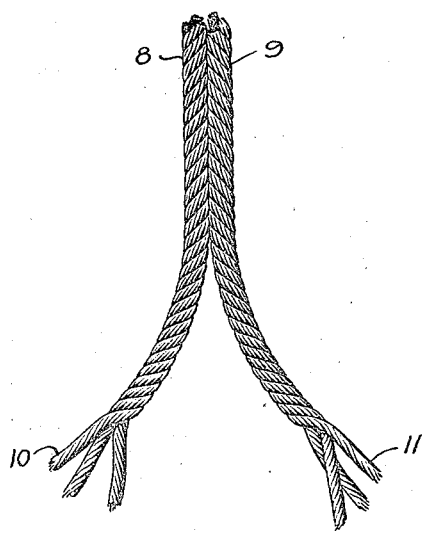
Fig. 2 is a perspective of a pair of contiguous cords of the present invention disposed to illustrate the similar direction of extent of the oppositely twisted outer strands or yarns in adjacent stress-resisting-elements.

The stress-resisting-elements of the plies may be individually made in any of the aforementioned ways but the essential thing of the present invention is the direction of twist of the external or outer constituent strands of each element. According to my invention, the direction of twist is opposite in any pair thereof. In other words, alternately the elements have their strands twisted together oppositely. In Fig. 2 of the drawings, two of the stress-resisting-elements 8 and 9 are illustrated conventionally, the former having its strands 10 twisted to the left and the latter (9) having its strands 11 twisted oppositely to the right.

The strands 10 and 11 may be a roving, a coarse yarn, or a plied yarn, or any other like form, but, whatever form of constituent is employed to be twisted together finally to form the element, I prefer that the direction of twist of the fibers or single yarns making a strand be opposite to the direction several strands are twisted together. It is to be noted that while this is preferred, it is not essential as several rovings, for instance, may be twisted together in the same direction as each roving is individually twisted. And, therefore, it is reiterated that this invention is broadly concerned with the ultimate or final twisting of the strands making up the stress-resisting-elements, the elements alternately having their outlying strands twisted together oppositely.

Figure 3:
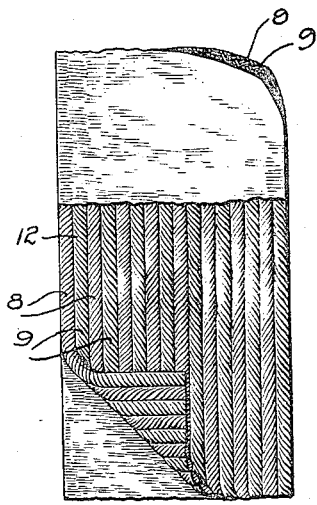
Fig. 3 is a plan view of a fragment of a preferred form of fabric and illustrates conventionally vulcanizable rubber applied thereto.

However the stress-resisting-elements may be constructed, I then form them into a fabric in any desired manner. It is preferred to form them into sheets in parallel, or substantially parallel, relation. This latter may be done by passing a suitable number of the elements in a layer and lying close together through a more or less liquid mass of rubber which, after drying, serves to hold the elements in sheet formation, as illustrated at 12 in Fig. 3; or by securing them together with weak inter-woven filling threads, widely spaced apart and comparatively small in cross-section, and hence, crimping the stress-resisting-elements very little. Both of these methods of fabrication or sheeting are old and well known, and either may be employed as desired.

The layer of stress-resisting-elements may however be rubberized, or coated with a vulcanizable rubber composition, or other plastic material, in any suitable manner and on one or both sides. I may, for instance, impregnate the cords individually or collectively with latex before applying to them a friction or skim coat of rubber stock, or the bare cords in the form of a sheet may be frictioned and skim coated with a vulcanizable rubber composition on a calender or in any convenient manner. In assembling the stress-resisting-elements in a sheet, the stress-resisting-elements are preferably supplied so that they will alternately have their strands twisted oppositely, at least externally, but two or more elements of one set may be alternated with a similar or even different number of the other set having the opposite outer or final twist and thereby obtain in a measure the advantages of the present invention.

After the fabric has been formed and rubberized, and also cut on the bias in pieces of suitable length and width, it may be employed for building tires, belts, hose, or like rubber articles, where, by reason of flexure, it is desirable to minimize abrasion and consequent breakage. After the article is built in the green or unvulcanized form, it may then be cured and finished for the market as desired.

Tires having stress-resisting-fabric of the present invention built up in plies therein have shown markedly improved qualities both on the test wheel and on test cars. And the fabric itself is an improvement over its predecessor as it may be manipulated with greater facility, the opposite twisting of the contiguous elements balancing each other and permitting the fabric to lie flat without tendency to curl or become distorted. This attribute is of especial advantage in cutting the fabric into plies preliminary to building operations. In the preferred form of construction—that is, the one in which the strands are made up of a plurality of single yarns plied together by twisting in a direction opposite to that in which the plied yarns or strands are twisted together—it is noted the invention not only insures the extent or disposition in the same direction of the strands at the lines of abrasion between the contiguous elements but also of the single yarns that are twisted together to form the strands. Even the individual fibers forming a single strand may be disposed in lengthwise, rather than crosswise, relation at their points of contact with similar fibers in the next element.

In the claims, the term "strands" is intended to comprehend any form of a constituent part of a stress-resisting-element, such as the rovings, coarse yarns, or plied yarns, which is exposed or located externally of the element where abrasion is likely, the invention comprehending a cord or element with a rubber or other core surrounded by fibrous strands as well as elements made of fibrous strands entirely. In the claims also, the term "cord-fabric" is intended to cover a reinforcing material for rubber goods having stress-resisting-elements or warps which usually extend lengthwise the material held together substantially parallel in sheet formation either by means of rubber only or by filling threads which are ordinarily comparatively small and weak and widely spaced—from ⅜ to ⅝", for example.

In the foregoing it has been endeavored to detail the invention sufficiently for its pursuit or practice by those skilled in the art, but it will be understood that variations may be made in the details of the invention, such as in the amount of twist, and in the number of constituent rovings, yarns, or strands, and in the alternation of the two series of oppositely twisted cords or elements, without departure from its underlying principles and that reference should therefore be made to the accompanying claims for an understanding of its scope.

Having thus described my invention, what I claim and desire to protect by Letters Patent is:—

1. A rubberized cord fabric having stress-resisting-elements alternately composed of strands twisted together oppositely.

2. A rubberized cord fabric having contiguous stress-resisting-elements held in substantially parallel relation, the outlying constituent fibrous strands of stress-resisting-members being in lengthwise as distinguished from crosswise abrasive contact with the fibrous strands of adjacent flanking elements.

3. A rubberized reinforcing fabric having a series of stress-resisting-elements whose outlying fibrous strands are twisted together in one direction and a second series of similar elements twisted oppositely, a number of the elements of one series being alternated with a number of the elements of the other series so as to permit the fabric to lie substantially flat.

4. A vulcanized rubber article having a stratum of stress-resisting-elements, which are liable to contact and abrade each other in service, the elements externally being alternately formed of strands twisted together oppositely.

5. A vulcanized tire casing having a plurality of layers of substantially parallel stress-resisting-elements, the elements in a layer being alternately formed of strands twisted together oppositely.

Signed at New York, New York, this 1st day of July, 1922.

ALFRED E. JURY.